(12) United States Patent
Shimoda

(10) Patent No.: US 10,324,438 B2
(45) Date of Patent: Jun. 18, 2019

(54) SEQUENCE-CONTROL PROGRAMMING APPARATUS, SEQUENCE-CONTROL PROGRAMMING METHOD, AND OPERATING SYSTEM

(71) Applicant: FANUC CORPORATION, Yamanashi (JP)

(72) Inventor: Yasuyuki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/353,393

(22) Filed: Nov. 16, 2016

(65) Prior Publication Data

US 2017/0139390 A1 May 18, 2017

(30) Foreign Application Priority Data

Nov. 17, 2015 (JP) ................................. 2015-224963

(51) Int. Cl.
*G06F 19/00* (2018.01)
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/13026* (2013.01); *G05B 2219/23011* (2013.01)

(58) Field of Classification Search
CPC combination set(s) only.
See application file for complete search history.

(56) References Cited

U.S. PATENT DOCUMENTS

| 4,021,783 A * | 5/1977 | Highberger | ............ G05B 19/05 |
| | | | 700/18 |
| 4,396,974 A * | 8/1983 | Imazeki | ............... G05B 19/056 |
| | | | 483/1 |
| 4,972,310 A * | 11/1990 | Onodera | ................ G05B 19/05 |
| | | | 700/19 |

(Continued)

FOREIGN PATENT DOCUMENTS

JP  63-151004 U  10/1988
JP  7-49651 A  2/1995

(Continued)

*Primary Examiner* — Kidest Bahta
(74) *Attorney, Agent, or Firm* — Hauptman Ham, LLP

(57) ABSTRACT

An apparatus for generating a control program for sequence control. The sequence-control programming apparatus includes a storage section configured to store plural types of given ladders respectively describing plural types of commands separately from each other by ladder logic, the commands related to a specific operation to be executed by the operating system; a selection input section configured to receive a selection input for selecting a plurality of desired given ladders from the plural types of given ladders; and a program generating section configured to extract the plurality of desired given ladders from the storage section in accordance with the selection input, and combine the extracted desired given ladders to convert the extracted desired given ladders into a single system-compatible ladder configured to make the operating system execute the specific operation, so as to generate the control program.

8 Claims, 15 Drawing Sheets

(56) References Cited

U.S. PATENT DOCUMENTS

| | | | | |
|---|---|---|---|---|
| 5,177,420 A * | 1/1993 | Wada | ............... | G05B 19/056 |
| | | | | 318/568.1 |
| 5,251,122 A * | 10/1993 | Sakamoto | ............ | G05B 19/056 |
| | | | | 700/110 |
| 5,574,637 A * | 11/1996 | Obata | ............. | G05B 19/41835 |
| | | | | 700/2 |
| 6,021,357 A * | 2/2000 | Peterson | ............. | G05B 19/056 |
| | | | | 700/12 |
| 6,169,929 B1 * | 1/2001 | Izzo | ................. | G05B 19/054 |
| | | | | 700/18 |
| 2007/0093917 A1 | 4/2007 | Steinman | | |
| 2012/0079157 A1 * | 3/2012 | Weatherhead | ..... | G05B 19/0426 |
| | | | | 710/305 |
| 2012/0222001 A1 * | 8/2012 | Nakai | ............... | G05B 19/0426 |
| | | | | 717/110 |

FOREIGN PATENT DOCUMENTS

| | | |
|---|---|---|
| JP | 2004-157913 A | 6/2004 |
| JP | 2004-199524 A | 7/2004 |
| JP | 2008264928 A | 11/2008 |

\* cited by examiner

FIG. 4

| Item NO. | Name | Major functions | Specification 1 | Specification 2 | Select |
|---|---|---|---|---|---|
| RA0001 | Robot control management 1 | Robot start, stop, fault, I/O signal | LR Mate 200iD | R-30iA Mate | ✓ |
| RA0002 | Robot control management 2 | Robot start, stop, fault, I/O signal | R-2000iB | R-30iA | |
| SA0001 | Input/output signal management 1 | Robot, Mate | LR Mate 200iD | R-30iA Mate | ✓ |
| SA0002 | Input/output signal management 2 | Robot, R-301A | R-2000iB | R-30iA | |
| MT0001 | Process Machine management 1 | Process Machine 0001 | D21S | | ✓ |
| MT0002 | Process Machine management 2 | Process Machine 0001 | D21M | | ✓ |
| SX0001 | System start/stop management | Operation panel | Switch 30, LED 50, Others 20 | | ✓ |
| SX0002 | System start/stop management | Touch panel | Standard panel 1 | | ✓ |
| XX0001 | Workpiece conditions | System 1 | Dedicated workpiece pallet | | ✓ |
| AL0001 | Alarm management 0001 | Robot, Mate | LR Mate 200iD | R-30iA Mate | ✓ |
| AL0002 | Alarm management 0002 | Robot, Mate | R-2000iB | R-30iA | |

FIG. 5

| Item | Name | Selection contents | Set |
|---|---|---|---|
| 1 | Type of robot | R-30iA Mate | ✔ |
| | | R-30iA | |
| 2 | Number of robots | 1 | ✔ |
| | | 2 | |
| | | 3 | |
| | | 4 | |
| 3 | Robot I/O signal | I/O link communication | ✔ |
| | | DeviceNet communication | |
| | | CC-Link communication | |
| | | Parallel I/O | |
| 4 | Robot starting means | Start PNS1-8 | ✔ |
| | | Start with fixed PNS1 + program selection GI | |
| | | Start RSR1-8 | |
| | | Start with fixed RSR1 + program selection GI | |
| | | Two-robot coordinated control | |
| 5 | PAUSED signal management | Start conditions include PAUSED | |
| | | Start conditions do not include PAUSED | ✔ |

SEQUENCE-CONTROL PROGRAMMING APPARATUS, SEQUENCE-CONTROL PROGRAMMING METHOD, AND OPERATING SYSTEM

RELATED APPLICATIONS

The present application claims priority to Japanese Patent Application Number 2015-224963, filed Nov. 17, 2015, the disclosure of which is hereby incorporated by reference herein in its entirety.

BACKGROUND OF THE INVENTION

1. Field of the Invention

The present invention relates to a sequence-control programming apparatus and a sequence-control programming method, configured to generate a control program for sequence control. The invention also relates to an operating system including a sequence-control programming apparatus.

2. Description of the Related Art

An operating system which includes a robot and an operating instrument (e.g., an end effector, a process machine, a conveying device, etc.) cooperating with each other, may have a variety of configurations. It is also common practice to redesign the previously designed configuration of the operating system so as to correspond to a change in the type of the robot or the operating instrument, in the number of robots or operating instruments, etc. The designing of the operating system includes creating a control program for sequence control of the robot or the operating instrument. Usually, the control program for sequence control includes various commands or parameters described using a specialized description method known as ladder logic, and the creation of the control program requires knowledge and skill, related to programming using the ladder logic. The control program is stored in a memory incorporated in a controller, such as a PLC (Programmable Logic Controller) for controlling the overall operation of the operating system, a robot controller for controlling the robot, etc., and when the control program is rewritten, a new control program created by rewriting is also stored in the memory in addition to the old program, which may require the provision of a large capacity memory or may affect an arithmetic processing by the controller.

For example, Japanese Unexamined Patent Publication No. 2008-264928 (JP 2008-264928 A) discloses an initial setting method for an industrial robot, in which a ladder program is created in advance, which includes an operation program for making a plurality of peripheral devices connected to the industrial robot perform a sequence of operations, and an instruction as to whether or not to operate each of the peripheral devices is entered with respect to the ladder program through a selection using an input switch of a touch panel, so as to be able to create a control program complying with the requirement of an actual operation.

SUMMARY OF THE INVENTION

In a technique for creating a control program for sequence control of an operating system including a robot, it is desired to make it possible to easily create or rewrite the control program so as to correspond to a variety of possible configurations of the operating system, and to avoid an increase in the memory capacity of the controller of the operating system or an influence on the arithmetic processing of the controller due to an increased amount of stored data.

One aspect of the present invention is a sequence-control programming apparatus configured to generate a control program for sequence control of an operating system including a robot, the sequence-control programming apparatus comprising a storage section configured to store plural types of given ladders respectively describing plural types of commands separately from each other by ladder logic, the commands related to a specific operation to be executed by the operating system; a selection input section configured to receive a selection input for selecting a plurality of desired given ladders from the plural types of given ladders; and a program generating section configured to extract the plurality of desired given ladders from the storage section in accordance with the selection input, and combine the extracted desired given ladders to convert the extracted desired given ladders into a single system-compatible ladder configured to make the operating system execute the specific operation, so as to generate the control program.

Another aspect of the present invention is an operating system comprising the sequence-control programming apparatus as described above; a robot; an operating instrument configured to cooperate with the robot; and a controller configured to control at least one of the robot and the operating instrument in accordance with the control program generated by the sequence-control programming apparatus.

A further aspect of the present invention is a sequence-control programming method configured to generate a control program for sequence control of an operating system including a robot, the sequence-control programming method comprising providing plural types of given ladders respectively describing plural types of commands separately from each other by ladder logic, the commands related to a specific operation to be executed by the operating system; extracting a plurality of desired given ladders from the plural types of given ladders; and combining the extracted desired given ladders to convert the extracted desired given ladders into a single system-compatible ladder configured to make the operating system execute the specific operation, so as to generate the control program.

In the sequence-control programming apparatus according to one aspect, the program generating section is configured to generate the control program by extracting the plurality of desired given ladders from the plural types of given ladders previously stored in the storage section, in accordance with the selection input received by the selection input section, and by combining the extracted given ladders to convert the extracted given ladders into the single system-compatible ladder, so that it is possible to easily create or rewrite the control program so as to correspond to a variety of possible configurations of the operating system. Furthermore, only the control program corresponding to the actual configuration of the operating system needs to be provided for the operating system, so that it is possible to avoid an increase in the memory capacity of the controller of the operating system and/or an influence on the arithmetic processing due to an increased amount of stored data.

In the operating system according to the other aspect, it is possible for a system designer to create or rewrite the control program so as to correspond to the actual operating system, only by performing the selection input for the desired given ladders and performing a parameter input for the selected given ladders.

In the sequence-control programming method according to the further aspect, effects analogous to the aforementioned effects of the sequence-control programming apparatus can be achieved.

BRIEF DESCRIPTION OF THE DRAWINGS

The objects, features and advantages of the present invention will become more apparent from the following description of the embodiments in connection with the accompanying drawings, wherein:

FIG. 4 is an illustration showing one example of a selection sheet used in the sequence-control programming apparatus;

FIG. 5 is an illustration showing one example of a setting sheet used in the sequence-control programming apparatus;

DETAILED DESCRIPTION

Figure 1:
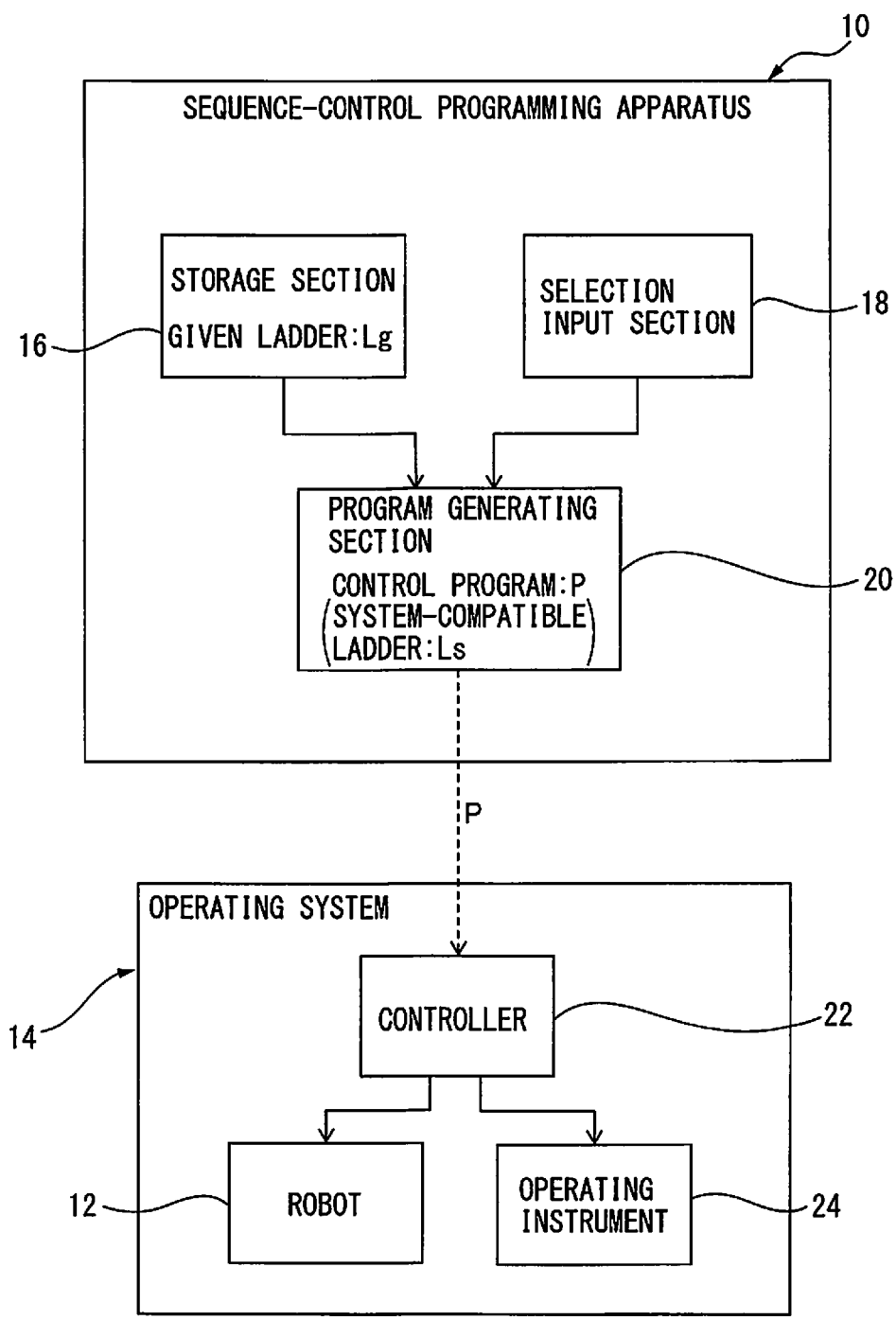
FIG. 1 is a functional block diagram showing the configuration of a sequence-control programming apparatus according to a first embodiment.

Embodiments of the present invention will be described below with reference to the accompanying drawings. Throughout the drawings, corresponding components are denoted by common reference numerals.

FIG. 1 shows, in a functional block diagram, the configuration of a sequence-control programming apparatus 10 according to a first embodiment. The sequence-control programming apparatus 10 has a configuration for generating a control program P for sequence control of an operating system 14 incorporating a robot 12. The sequence-control programming apparatus 10 includes a storage section 16 configured to store plural types of given ladders Lg respectively describing plural types of commands separately from each other by using ladder logic, the commands related to a specific operation to be executed by the operating system 14; a selection input section 18 configured to receive a selection input for selecting a plurality of desired given ladders Lg from the plural types of given ladders Lg; and a program generating section 20 configured to extract the plurality of desired given ladders Lg from the storage section 16 in accordance with the selection input, and combine the extracted desired given ladders Lg to convert the extracted desired given ladders into a single system-compatible ladder Ls configured to make the operating system 14 execute the specific operation, so as to generate the control program P.

The sequence-control programming apparatus 10 has a configuration of an arithmetic processing unit, such as a personal computer, different from a controller 22 for controlling the operating system 14. The operating system 14 includes at least a robot 12 and an operating instrument (e.g., an end effector, a process machine, a conveying device, etc.) 24 cooperating with each other, and may have a variety of configurations according to an operation to be executed. The controller 22 includes various controllers, such as a PLC (Programmable Logic Controller) for controlling the overall operation of the operating system 14, a robot controller for controlling the robot 12, etc. A designer of the operating system 14 determines the type, number, etc., of robots 12 and/or operating instruments 24 in accordance with the contents of the operation, and provides the control program P for the controller 22 in order to take the sequence control of the robot 12 and/or the operating instrument 24. The sequence-control programming apparatus 10 assists the creation of the control program, which has been conventionally performed entirely by the designer of the operating system.

Prior to the designing of the operating system 14, the plural types of given ladders Lg are previously stored in the storage section 16. The given ladders Lg respectively describe, separately from each other by using ladder logic, the plural types of commands (e.g., operation commands to the robot and/or the process machine) supposed to be probably necessary for the operating system 14 to execute a specific operation (e.g., workpiece processing by the process machine). Each of the given ladders Lg is able to constitute a part of the control program P, but it is not possible to accomplish one cycle of operation by only one given ladder Lg. In the given ladder Lg, it is possible to previously describe, in addition to a command, various parameters for materializing the command correspondingly to the configuration of the actual operating system 14. Alternatively, a configuration may be adopted wherein no parameter is described in the given ladder Lg, and a parameter is added to each given ladder Lg, as needed, at the stage of designing the system.

The plural types of given ladders Lg to be stored in the storage section 16 are prepared by the designer of the operating system 14 in accordance with the contents of the operation to be executed by the operating system 14, and may be stored in the storage section 16 in the form of a single ladder package. The ladder package does not contain an irrelevant given ladder that is not supposed to be probably necessary for the operating system 14 to execute the specific operation. Considering that the designer may design a variety of operating systems, given ladders Lg supposed to be necessary for the respective operating systems may be prepared in the form of separate or different ladder packages which in turn may be stored in the storage section 16.

The selection input section 18 is able to receive the selection input of the given ladder Lg, which is performed by the designer of the operating system 14 with use of, for example, an input function of a personal computer, and send an entered matter to the program generating section 20. The designer of the operating system 14 selects, from the plural types of given ladders Lg supposed in advance to be probably necessary for the operating system 14 to execute a specific operation, a plurality of desired given ladders Lg required for an actual operating system 14 designed in practice by the designer.

In order for the operating system 14 to accomplish a specific operation, it is required for the controller 22 to issue various commands to the robot 12 and/or the operating instrument 24. Even in the case of the same type of operation (e.g., workpiece processing by the process machine), when conditions, such as the shape of a workpiece shape, the type of the robot 12 and/or the operating instrument 24, etc., are changed, it is necessary for the contents of the commands to be changed accordingly. The plural types of given ladders Lg stored in advance in the storage section 16 correspond to an extensive collection of commands that may become necessary for executing the same type of operation. The plurality of desired given ladders Lg selected by the selection input received by the selection input section 18 correspond to dedicated commands extracted from the extensive collection of given ladders Lg, the dedicated commands being determined to be requited for the actual operating system 14. One example of how the selection input section 18 receives the selection input (or one example of how the system designer performs the selection input) will be described later.

The program generating section 20 refers to the selection input received by the selection input section 18, extracts the desired given ladders Lg, selected in the selection input, from the plural types of given ladders Lg stored in the storage section 16, and combines the extracted desired given ladders Lg in an appropriate order for conversion into the single system-compatible ladder Ls. The plurality of desired given ladders Lg extracted from the storage section 16 correspond respectively to independent and distinct command statements, and the system-compatible ladder Ls corresponds to a series of command statements constructed by unifying the distinct command statements in an order according to the system design, the series of command statements being required for the operating system 14 to accomplish the specific operation. The program generating section 20 converts the plurality of desired given ladders Lg into the single system-compatible ladder Ls with use of a prescribed algorithm, and thereby generates the control program P including the system-compatible ladder Ls. One example of the algorithm for converting the plurality of desired given ladders Lg into the single system-compatible ladder Ls will be described later.

The designer or operator of the operating system 14 can install the control program P generated by the program generating section 20 onto the controller 22 by using suitable means. For example, in a configuration in which the sequence-control programming apparatus 10 and the controller 22 are interconnected via a communication network, the control program P can be installed onto the controller 22 by using software such as a prepackaged installer.

In the sequence-control programming apparatus 10 having the above configuration, the program generating section 20 is configured to generate the control program P by extracting the plurality of desired given ladders Lg from the plural types of given ladders Lg previously stored in the storage section 16, in accordance with the selection input received by the selection input section 18, and by combining the extracted given ladders Lg for conversion into the single system-compatible ladder Ls, so that it is possible to easily create or rewrite the control program P so as to correspond to a variety of possible configurations of the operating system. Furthermore, only the control program P corresponding to the actual configuration of the operating system 14 needs to be installed on the controller 22 of the operating system 14, so that it is possible to avoid an increase in the memory capacity of the controller 22 and/or an influence on the arithmetic processing due to an increased amount of stored data.

In the above configuration, in the case where an operation that cannot be accomplished by only a selection from the plural types of given ladders Lg previously stored in the storage section 16 is produced (due to, e.g., the unexpected addition or type-change of the robot 12 and/or the operating instrument 24, etc.) at the stage of designing the operating system 14, it is advantageous to make it possible to additionally store in the storage section 16 a new given ladder Lg required to accomplish such operation. In view of this, the storage section 16 may be configured to be able to store, in addition to the previously stored plural types of given ladders Lg, a new given ladder Lg describing, by ladder logic, a new command related to the specific operation to be executed by the operating system 14 and different from the plural types of commands described in the previously stored given ladders Lg. In this configuration, the selection input section 18 receives a selection input for selecting the plurality of desired given ladders Lg from among the new given ladder Lg and the plural types of given ladders Lg, which are stored in the storage section 16. According to the above configuration, it is possible to accumulate knowledge about the given ladders Lg, acquired by the designer of the operating system 14 through the experience of designing a plurality of operating systems 14, by storing the knowledge in the storage section 16 as the new given ladder Lg as the knowledge is acquired, and to effectively utilize the accumulated knowledge at the time of subsequently designing an operating system 14.

Figure 2:
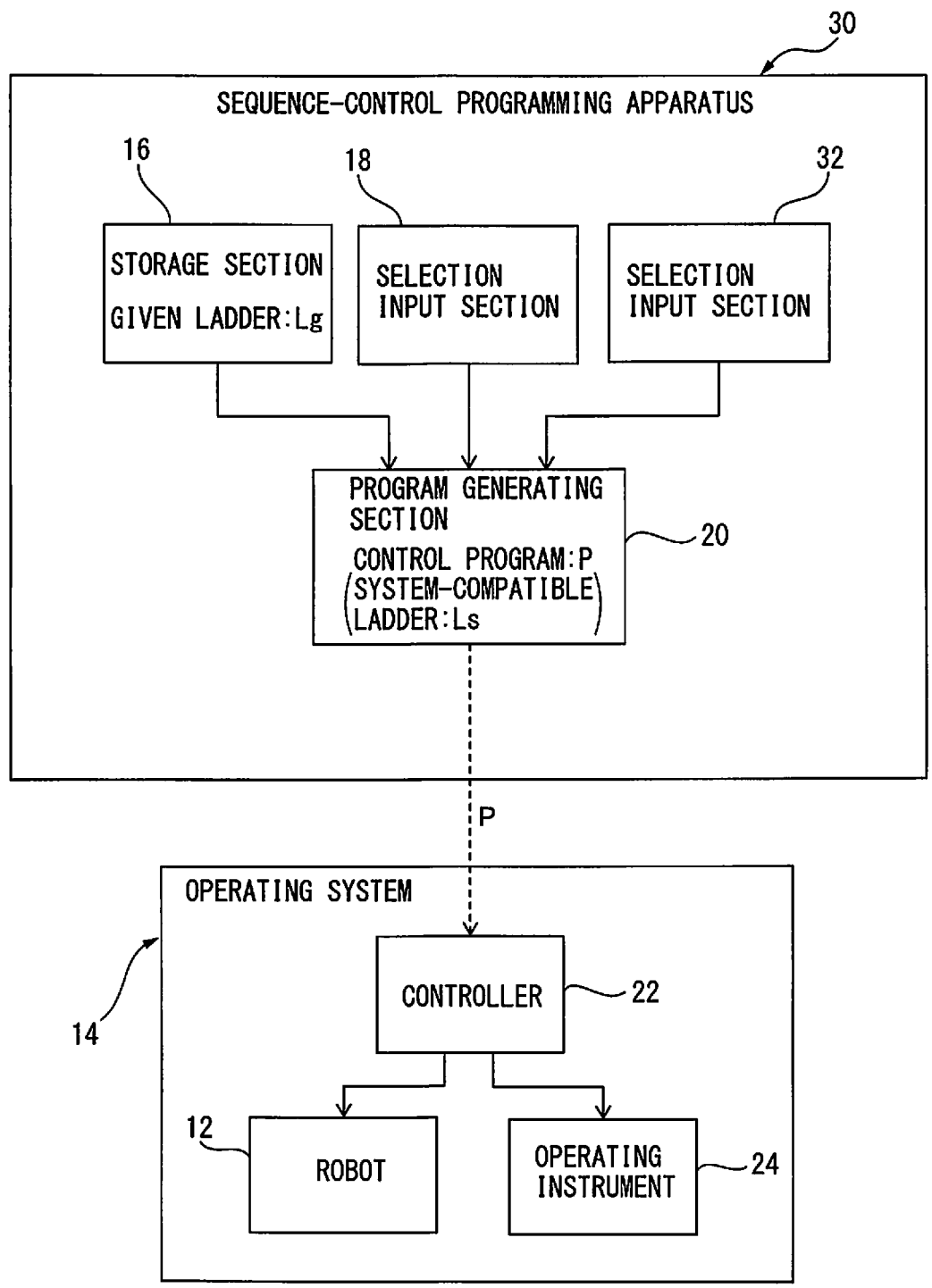
FIG. 2 is a functional block diagram showing the configuration of a sequence-control programming apparatus according to a second embodiment.

FIG. 2 shows, in a functional block diagram, the configuration of a sequence-control programming apparatus 30 according to a second embodiment. The sequence-control programming apparatus 30 has a configuration analogous to that of the sequence-control programming apparatus 10, except for the provision of a parameter input section 32 used for setting various parameters for the plural types of given ladders Lg stored in the storage section 16. Therefore, components corresponding to those previously described will be designated by the same reference numerals, and the detailed explanations thereof will not be repeated.

The sequence-control programming apparatus 30 includes, in addition to the aforementioned components of the sequence-control programming apparatus 10, the parameter input section 32 configured to receive a parameter input for setting a parameter, as needed, for each of the plural types of given ladders Lg stored in the storage section 16. The program generating section 20 is configured to add, in accordance with the parameter input, the parameter to the plurality of desired given ladders Lg extracted from the storage section 16, and converts the desired given ladders Lg with the parameter added thereto into the single system-compatible ladder Ls.

In the sequence-control programming apparatus 30, the plural types of given ladders Lg previously stored in the storage section 16 do not contain various parameters for materializing the described commands correspondingly to the configuration of the actual operating system 14. The designer of the operating system 14 performs, at the designing stage, the parameter input for setting a parameter, as needed, for each of the plurality of desired given ladders Lg selected by the selection input, with use of, for example, an input function of a personal computer. The parameter input section 32 is able to receive the parameter input performed by the designer, and send an entered matter to the program generating section 20. One example of how the parameter input section 32 receives the parameter input (or one example of how the system designer performs the parameter input) will be described later.

The program generating section 20 refers to the selection input received by the selection input section 18 and the parameter input received by the parameter input section 32, extracts the desired given ladders Lg, selected in the selection input, from the plural types of given ladders Lg stored in the storage section 16, sets the parameters in the extracted desired given ladders Lg, and combines the given ladders Lg with the parameters being set therefor in an appropriate order for conversion into the single system-compatible ladder Ls. The program generating section 20 converts the plurality of desired given ladders Lg with the parameters set therein into the single system-compatible ladder Ls with use of a prescribed algorithm, and thereby generates the control program P including the system-compatible ladder Ls.

In the sequence-control programming apparatus 30 having the above configuration, analogously to the aforementioned sequence-control programming apparatus 10, it is possible to easily create or rewrite the control program P so as to correspond to a variety of possible configurations of the operating system, and also to avoid an increase in the memory capacity of the controller 22 and/or an influence on the arithmetic processing due to an increased amount of stored data. Moreover, in the sequence-control programming apparatus 30, the parameters can be set, as needed, for the selected desired given ladders Lg at the stage of designing the operating system 14, so that it is possible to easily create the control programs P so as to correspond to a variety of operating systems, while reducing the number of types of given ladders Lg previously stored in the storage section 16.

Figure 3:
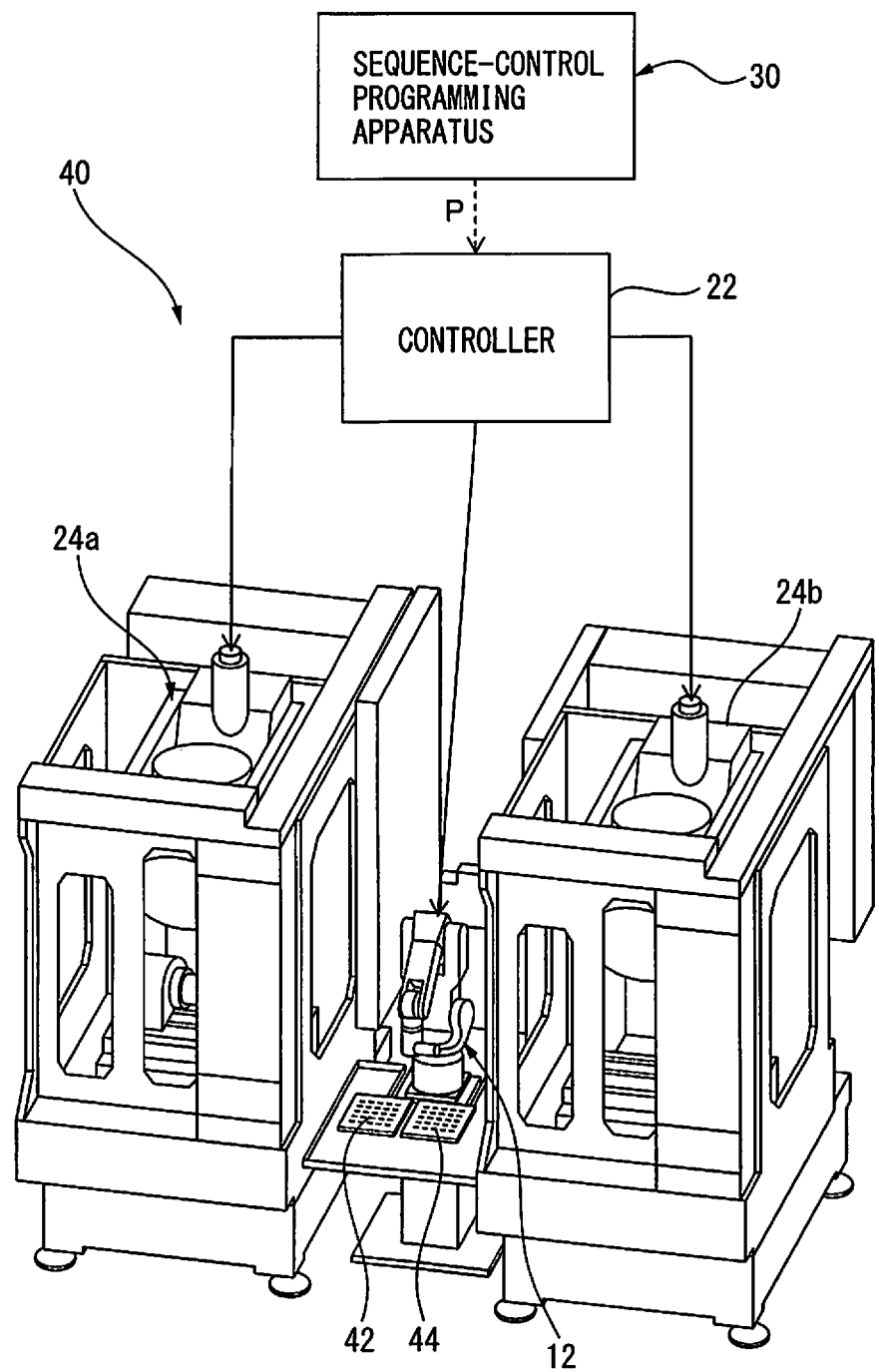
FIG. 3 is an illustration schematically showing the configuration of an operating system according to one embodiment.

FIG. 3 schematically shows the configuration of an operating system 40 according to one embodiment and including the sequence-control programming apparatus 30. The sequence-control programming apparatus 30 (or 10) may be constructed as an apparatus external to the operating system 14, as shown in FIGS. 1 and 2, or alternatively, as one component of the operating system 40, as shown in FIG. 3.

The operating system 40 includes the sequence-control programming apparatus 30, a single robot 12, two operating instruments 24 (a first process machine 24a and a second process machine 24b) configured to cooperate with the robot 12, and a controller 22 configured to control at least one of the robot 12 and the operating instruments 24 in accordance with the control program P generated by the sequence-control programming apparatus 30. The operating system 40 further includes a supply tray 42 on which an unprocessed workpiece is placed, and a discharge tray 44 on which a processed workpiece processed by the operating instrument 24 is placed.

As an example, the operating system 40 executes an operation including the following successive steps 1 to 8 (i.e., workpiece processing by the first process machine 24a and the second process machine 24b).

(1) An operator starts up the operating system 40.

(2) The robot 12 picks up an unprocessed workpiece from the supply tray 42 and attaches it to a jig of the first process machine 24a.

(3) The first process machine 24a starts to process the unprocessed workpiece.

(4) The robot 12 picks up an unprocessed workpiece from the supply tray 42 and attaches it to a jig of the second process machine 24b.

(5) The second process machine 24b starts to process the unprocessed workpiece.

(6) After the processing steps are completed in the first process machine 24a or the second process machine 24b, the robot takes the processed workpiece from the first process machine 24a or the second process machine 24b, places it on the discharge tray 44, picks up a new unprocessed workpiece from the supply tray 42, and attaches it to the jig of the first process machine 24a or the second process machine 24b.

(7) Steps 2 to 6 are repeated a predetermined number of times.

(8) After step 7 is completed, the operator stops the operating system 40.

Then, a concrete example of how the sequence-control programming apparatus 30 generates the control program P in the operating system 40 will be described with reference to FIGS. 4 to 10.

In order for the operating system 40 to carry out the workpiece processing operation including aforementioned steps 1 to 8, it is supposed that the following plural types of commands "a" to "f" are required.

(a) Command related to management of a robot control (b) Command related to management of an input/output signal (c) Command related to management of a process machine (d) Command related to management of a system start/stop (e) Command related to workpiece conditions (f) Command related to management of an alarm Then, the designer of the operating system 40 provides plural types of given ladders Lg respectively describing the plural types of commands "a" to "f" separately from each other by ladder logic, and previously stores the given ladders Lg in the form of a single package in the storage section 16 of the sequence-control programming apparatus 30. Each of the commands "a" to "f" can describe several different contents according to certain conditions, such as the type of the robot 12 and/or the operating instrument 24 useable in the operating system 40, and therefore, in connection with each type of the aforementioned commands (e.g., the command "a"), several given ladders Lg respectively describing commands of different contents (e.g., commands "a", "a'", "a''", etc.) separately from each other can be provided. As a concrete example, a total of 11 (eleven) given ladders Lg (item numbers RA0001 to AL0002) shown in FIG. 4 can be provided in connection with the commands "a" to "f".

FIG. 4 shows one example of a selection sheet 46, in which the attributes (item No., name, function and specification, in the drawing) of the plural types of given ladders Lg stored in the form of a package in the storage section 16 are listed in a table. The selection sheet 46 includes a select field 48 allowing the designer of the operating system 40 to perform a selection input for a given ladder Lg.

The sequence-control programming apparatus 30 prepares the selection sheet 46 shown in FIG. 4 in relation to the plural types of given ladders Lg previously stored in the storage section 16, and displays the selection sheet 46 on, for example, a display unit connected to a personal computer. The system designer refers to the displayed selection sheet 46, selects, one for each of the aforementioned commands "a" to "f", the plurality of desired given ladders Lg required for an actual operating system 14 designed in practice, and performs the selection input in the selection field 48 by, for example, the input function of the personal computer. In the illustrated example, the given ladders Lg of item numbers RA0001, SA0001, MT0001, SX0001, XX0001 and AL0001 are selected. The selection input section 18 receives the selection input for the given ladders Lg by using the selection sheet 46, and sends the program generating section 20 a matter that the given ladders Lg of item numbers RA0001, SA0001, MT0001, SX0001, XX0001, and AL0001 have been selected.

FIG. 5 shows one example of a setting sheet 50 used for setting a parameter for each of the plural types of given ladders Lg stored in the storage section 16. The setting sheet 50 has a configuration in which the attributes (item, name and selection contents, in the drawing) of one or more parameters required to be set in each given ladder Lg are listed in a table, and is prepared in advance for each of the plural types of given ladders Lg stored in the storage section 16. In the illustrated example, with respect to a single given ladder Lg describing the command of "robot control processing 1" (item number RA0001) shown in FIG. 4, two or more alternative parameters are prepared for each of the plurality of (five, in the drawing) items for which the parameter setting is required. The setting sheet 50 includes a set field 52 allowing the designer of the operating system 40 to perform a parameter input.

After completing the selection of the desired given ladders Lg by using the selection sheet 46, the sequence-control programming apparatus 30 displays the setting sheet 50 corresponding to each selected given ladder Lg on, for example, a display unit connected to a personal computer. The system designer refers to the displayed setting sheet 50, selects, one for each item, the parameters for materializing the command of each given ladder Lg correspondingly to the configuration of the actual operating system 14, and performs the parameter input in the setting field 52 by, for example, the input function of the personal computer. The parameter input section 32 receives the parameter input using the setting sheet 50, and sends the program generating section 20 a matter indicating which parameter has been set for each of the selected desired given ladders Lg.

Figure 6:
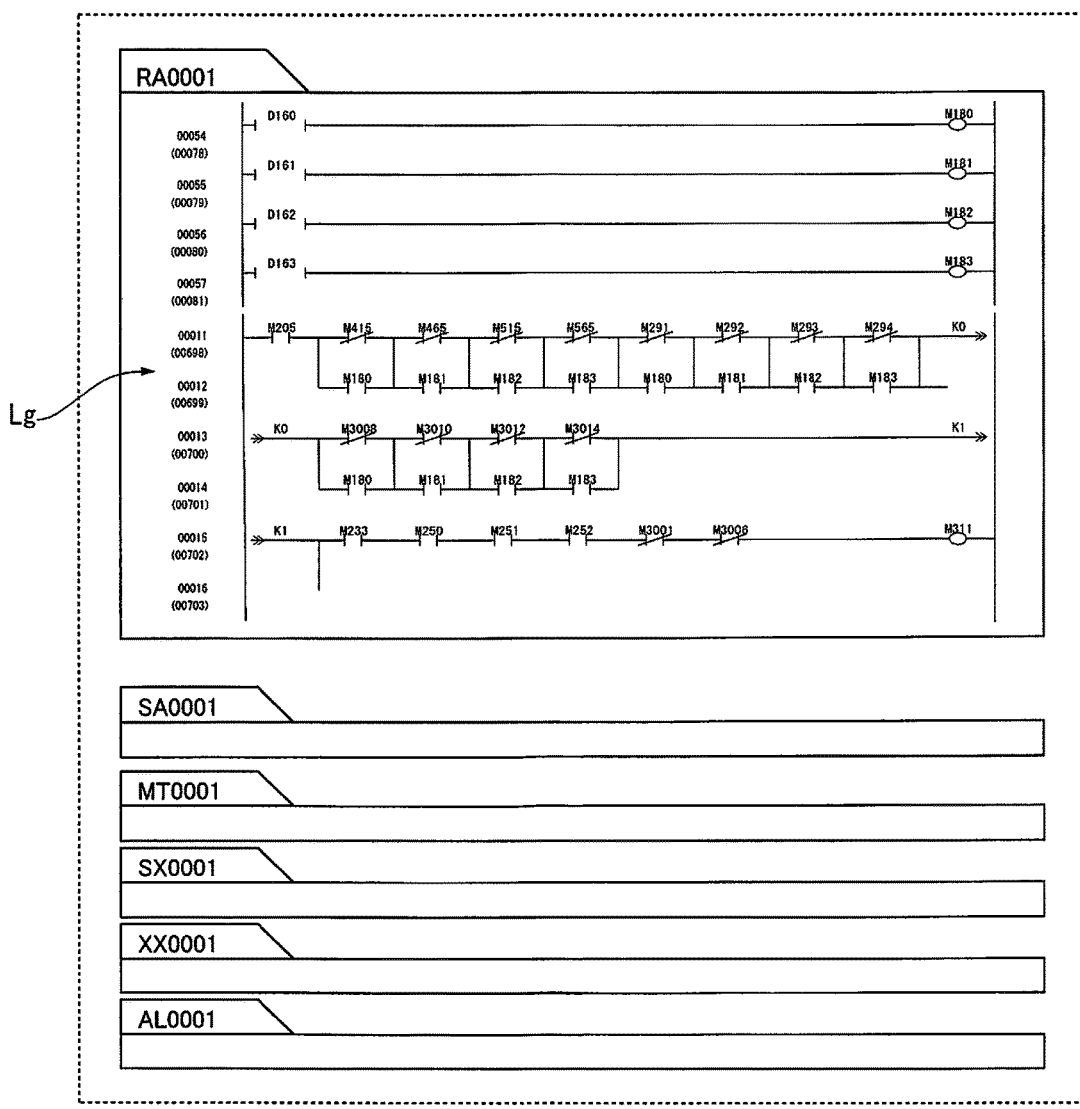
FIG. 6 is an illustration showing one example of a group of folders provided for given ladders selected using the selection sheet of FIG. 4.
Figure 7:
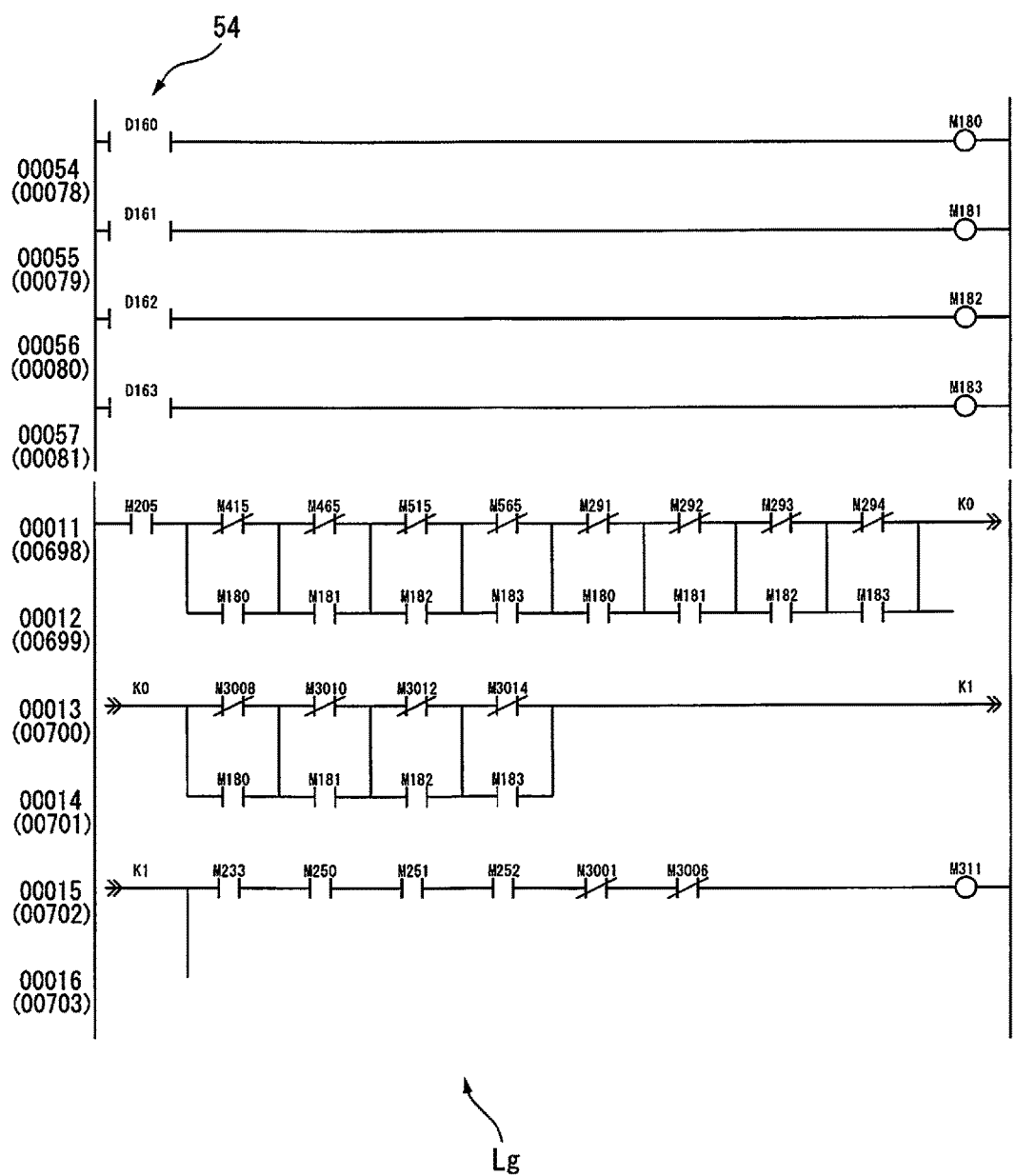
FIG. 7 is an illustration showing a given ladder stored in one of the folders in FIG. 6.

In the sequence-control programming apparatus 30, each of the plural types of given ladders Lg stored in the storage section 16 may be treated as a data file contained in a folder. The folder containing a single given ladder Lg may be provided with a folder name corresponding to the item number in the selection sheet 46. FIG. 6 shows a set of folders, each folder containing one of the plurality of desired given ladders Lg selected by using the selection sheet 46. FIG. 7 diagrammatically shows the given ladder Lg contained in single folder RA0001 shown in FIG. 6.

Figure 8:
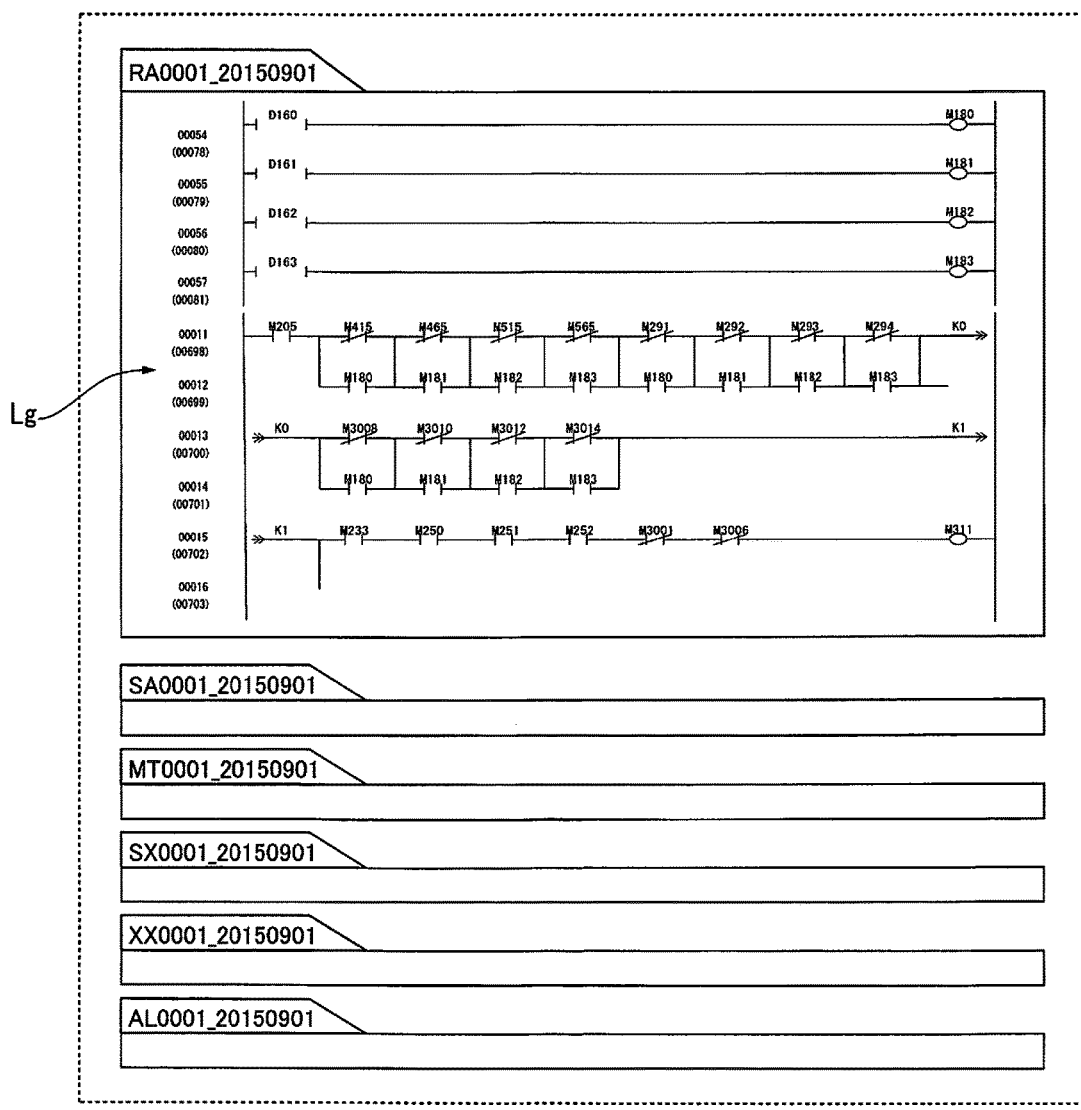
FIG. 8 is an illustration showing the group of folders of FIG. 6, in a state after the setting of parameters.
Figure 9:
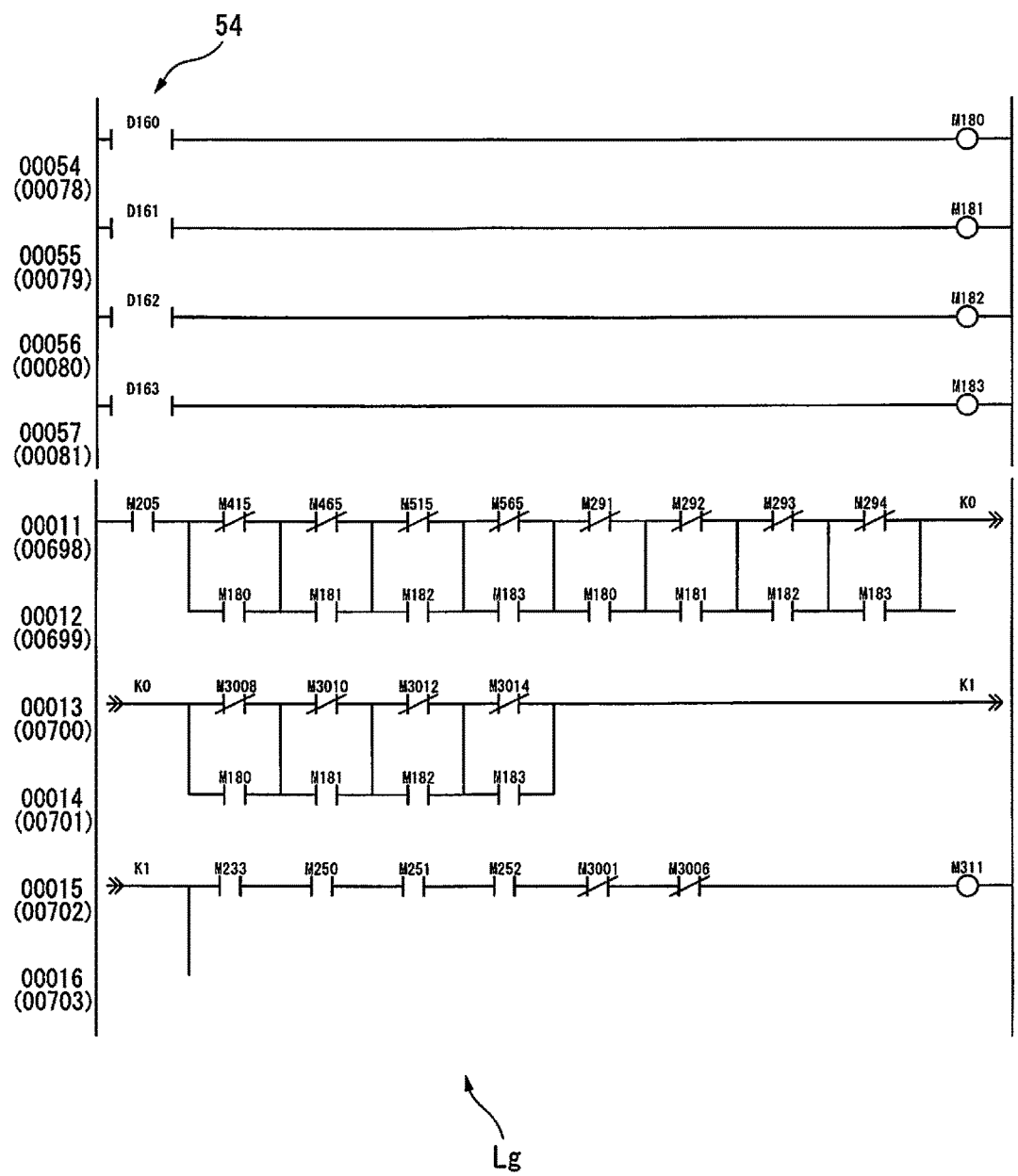
FIG. 9 is an illustration showing a given ladder stored in one of the folders in FIG. 8.

Further in the sequence-control programming apparatus 30, after completing the setting of the parameters by the parameter input for all of the given ladders Lg selected by the selection input, the folder name of each folder containing the given ladder Lg for which the parameter has been set may be suitably changed. FIG. 8 shows a set of folders, each folder containing the given ladder Lg with the parameter set therefor. The folder name of each folder has been changed by, for example, add a date of the parameter input. FIG. 9 diagrammatically shows the given ladder Lg contained in single folder RA0001_20150901 shown in FIG. 8.

As shown in FIG. 7, each given ladder Lg includes a coil (i.e., an output object in the ladder logic) 54 corresponding to the parameter indicated in the setting sheet 50. When the parameter input is performed by using the setting sheet 50, the program generating section 20 operates to turn "ON" (or activate) the coil corresponding to the parameter set in each given ladder Lg (see FIG. 9). The parameter setting for the given ladder Lg is thus completed.

Figure 10A:
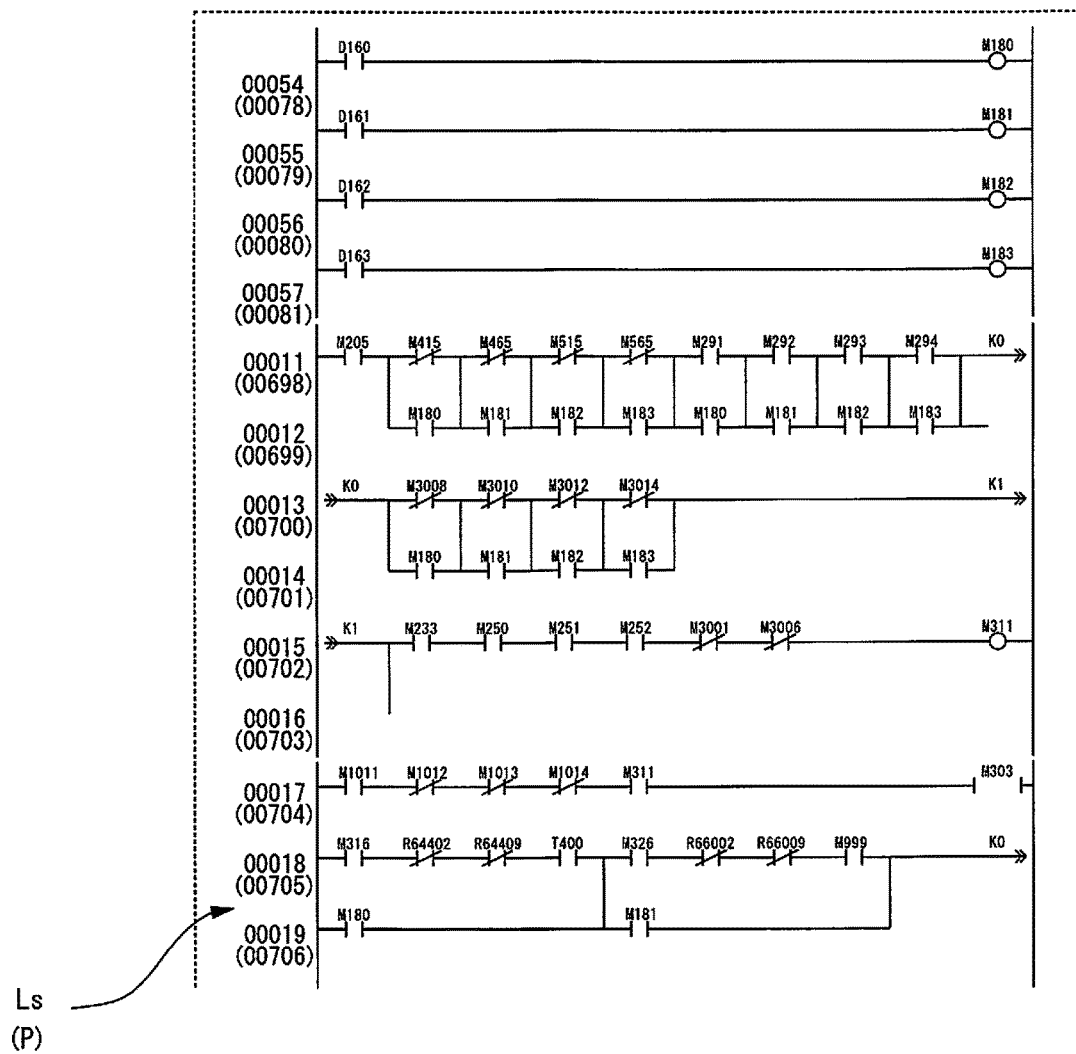
FIG. 10A is an upper portion.
Figure 10B:
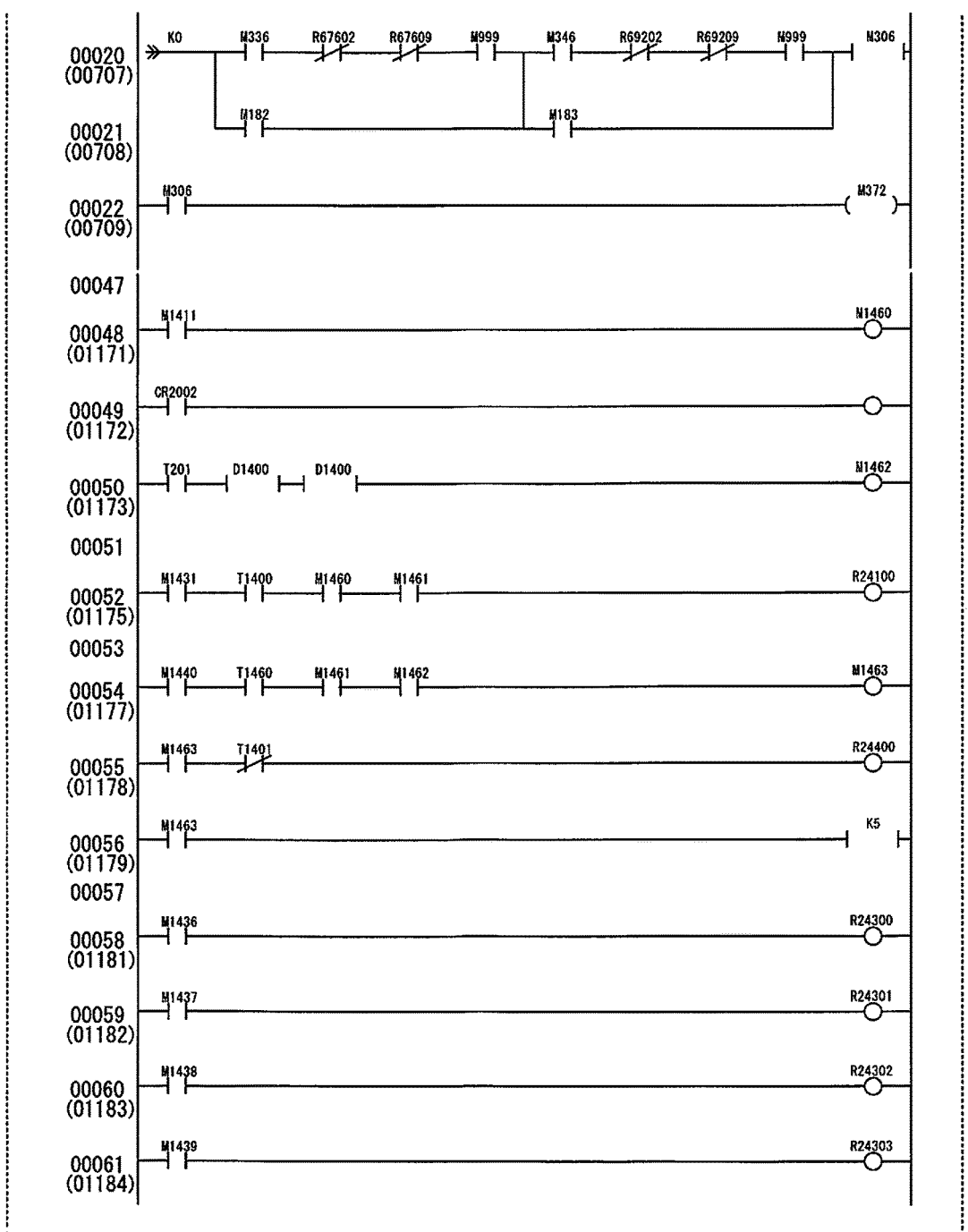
FIG. 10B is a lower portion continuous to the upper portion of FIG. 10A, of an illustration showing a single system-compatible ladder converted from the given ladders stored in the folders of FIG. 8.

After completing the setting of the parameters by the parameter input for all of the given ladders Lg selected by the selection input, the program generating section 20 operates to unify the plurality of given ladders Lg with the parameters set therefor, in an order according to the system design and with use of a prescribed algorithm, so as to produce a series of command statements required for the operating system 40 to accomplish the operation including aforementioned steps 1 to 8, and thereby converts the plurality of given ladders Lg into the system-compatible ladder Ls. FIG. 10 diagrammatically shows the system-compatible ladder Ls (i.e., the control program P) generated by converting the given ladders Lg contained in the distinct folders shown in FIG. 8. The control program P generated by the program generating section 20 is installed on the controller 22 (e.g., PLC) of the operating system 40.

When changing the contents of the operation to be executed in the operating system 40 by changing control conditions, functions, number of devices, etc., in connection with the robot 12 and/or the process machines 24a and 24b, it is necessary to rewrite the control program P. According to the operating system 40 including the sequence-control programming apparatus 30, the system designer can rewrite the control program P so as to correspond to the changed operation, only by performing again the selection input using the selection sheet 4 and performing again the parameter input using the setting sheet 50.

Figure 11:
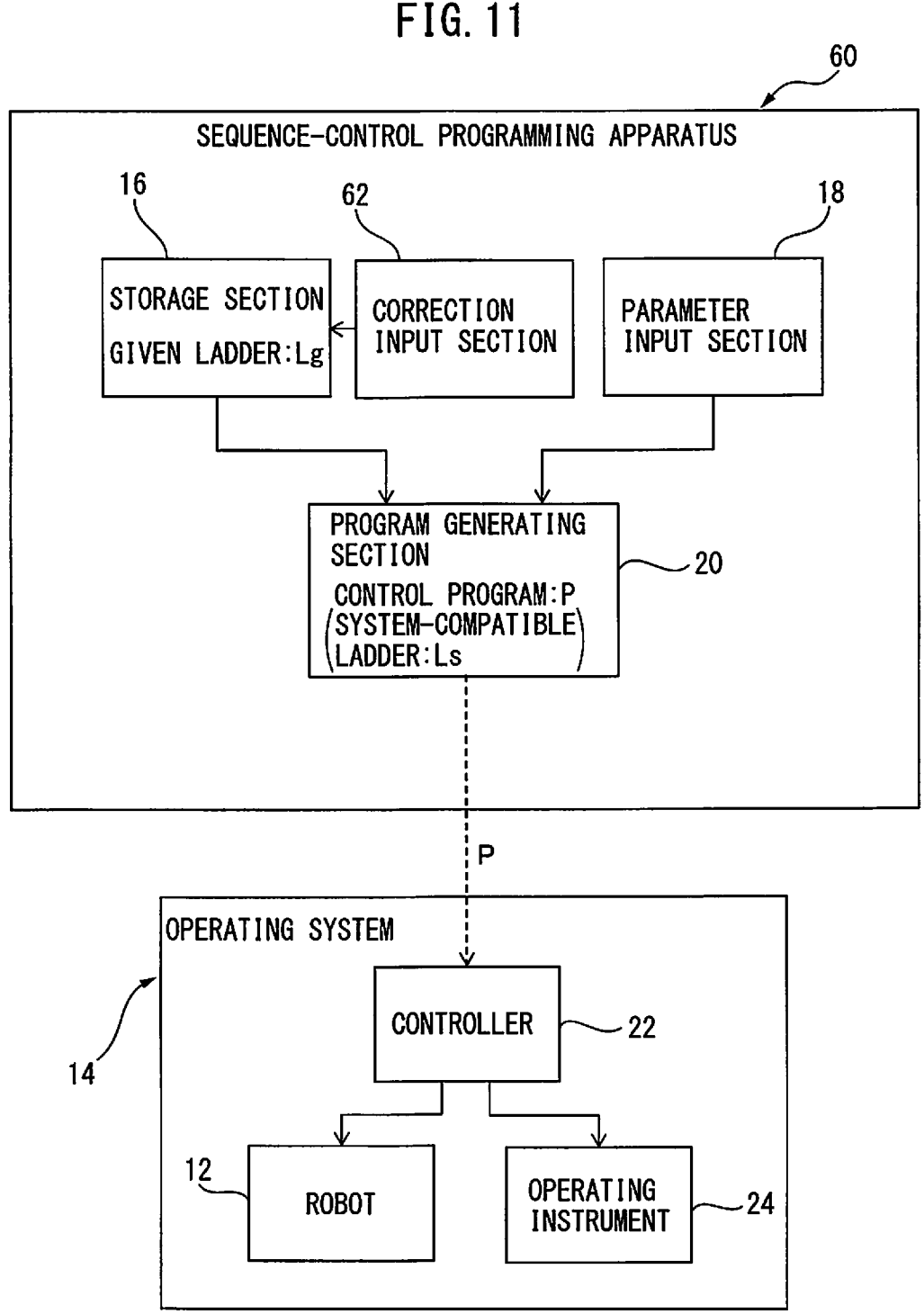
FIG. 11 is a functional block diagram showing the configuration of a sequence-control programming apparatus according to a third embodiment.

The sequence-control programming apparatus 10, 30 may also be configured to be able to correct, at a desired time, each of the plural types of given ladders Lg previously stored in the storage section 16. FIG. 11 shows, in a functional block diagram, the configuration of a sequence-control programming apparatus 60 according to a third embodiment, which has a ladder correcting function. The sequence-control programming apparatus 60 has a configuration analogous to that of the sequence-control programming apparatus 10, except for the provision of a correction input section 62 used for correcting each of the plural types of given ladders Lg previously stored in the storage section 16. Therefore, components corresponding to those previously described will be designated by the same reference numerals, and the detailed explanations thereof will not be repeated.

The sequence-control programming apparatus 60 includes, in addition to the aforementioned components of the sequence-control programming apparatus 10, the correction input section 62 configured to receive a correction input for correcting a command, as needed, for a given ladder Lg stored in the storage section 16. The program generating section 20 extracts a plurality of desired given ladders Lg in accordance with the selection input received by the selection input section 18 from among the plural types of given ladders Lg including the given ladder Lg corrected in accordance with the correction input received by the correction input section 62, and generates the control program P by converting the extracted desired given ladders Lg into a single system-compatible ladder Ls.

Figure 12:
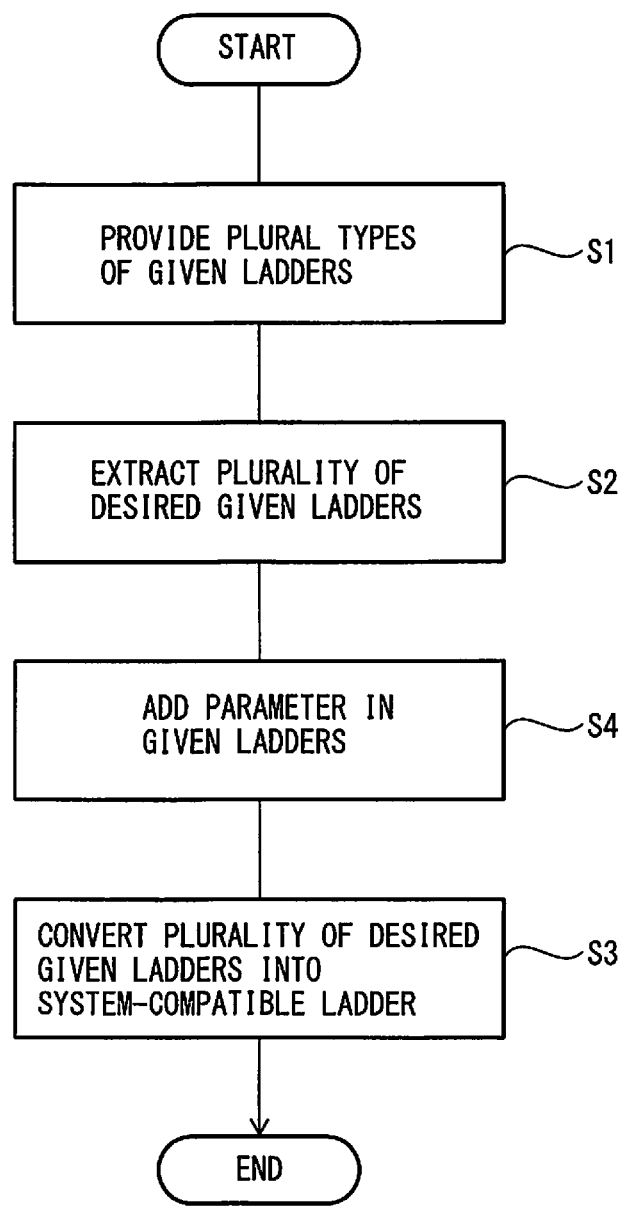
FIG. 12 is a flowchart showing a sequence-control programming method according to one embodiment.

FIG. 12 shows, in the form of a flowchart, a sequence-control programming method carried out by the sequence-control programming apparatus 10, 30, 60. The illustrated sequence-control programming method is configured to generate a control program P for sequence control of an operating system 14, 40 including a robot 12, and includes step S1 for providing plural types of given ladders Lg respectively describing plural types of commands separately from each other by ladder logic, the commands related to a specific operation to be executed by the operating system 14, 40; step S2 for extracting a plurality of desired given ladders Lg from the plural types of given ladders Lg; and step S3 for combining the extracted desired given ladders Lg to convert the extracted desired given ladders Lg into a single system-compatible ladder Ls configured to make the operating system 14, 40 execute the specific operation, so as to generate the control program P. The method may further includes, between steps 2 and 3, step S4 for adding a parameter, as needed, to the extracted desired given ladders Lg. In this configuration, in step S3, the desired given ladders with the parameter added thereto are converted into the single system-compatible ladder Ls.

Figure 13:
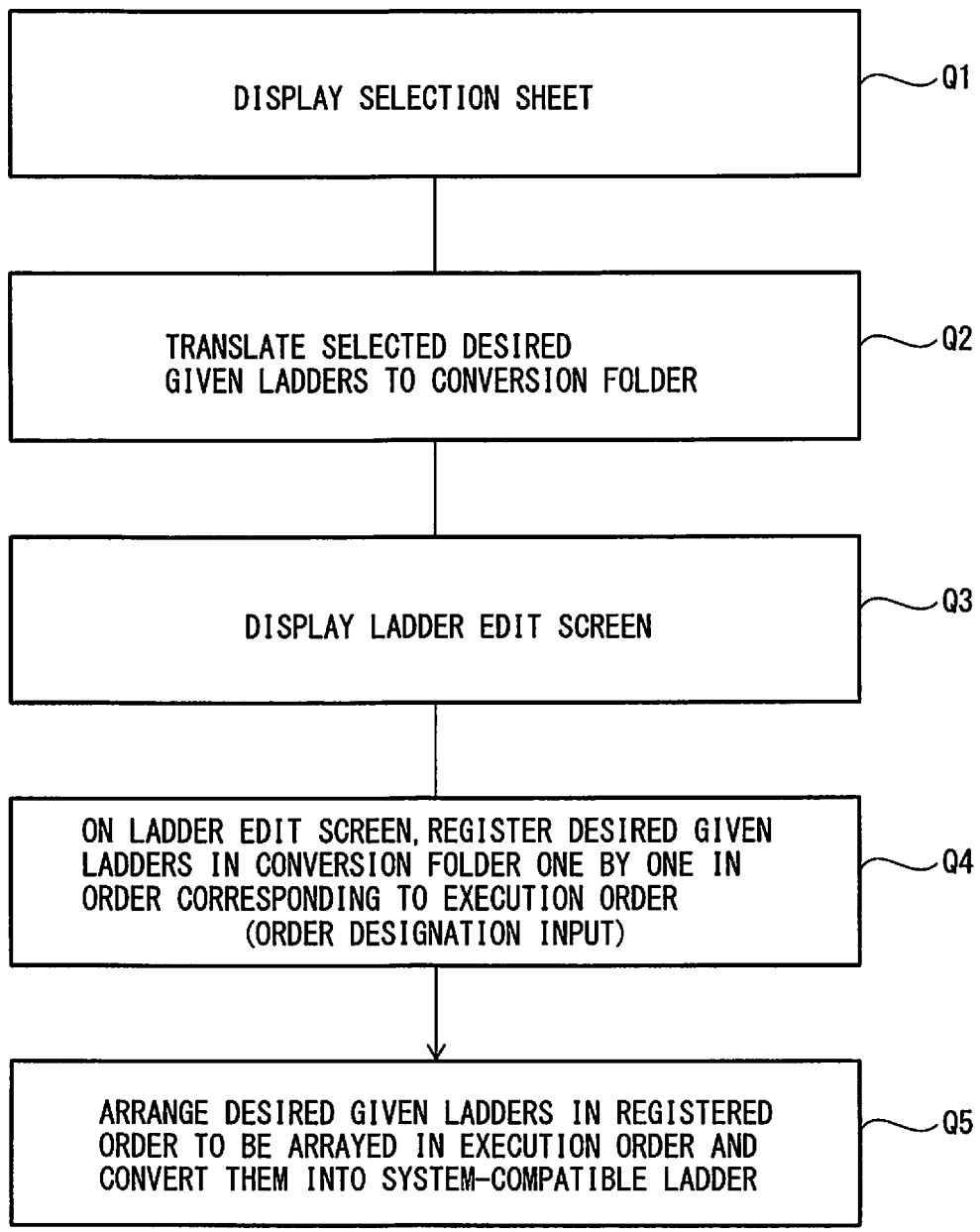
FIG. 13 is a flowchart showing one example of a ladder conversion algorithm.

FIG. 13 shows one example of an algorithm used by the program generating section 20 of the sequence-control programming apparatus 10, 30, 60 for converting the plurality of desired given ladders Lg into the single system-compatible ladder Ls. The illustrated ladder conversion algorithm includes acts executed by the sequence-control programming apparatus 10, 30, 60 and acts performed by the designer of the operating system 14, 40.

First, the sequence-control programming apparatus 10, 30, 60 displays the selection sheet 46 of FIG. 4 on, for example, a display connected to a personal computer (Q1). The designer of the operating system 14, 40 performs the selection input on the selection sheet 46 in the aforementioned procedure, and translates the selected desired given ladders Lg to a "conversion folder" previously provided by, for example, a function of a personal computer (Q2). The system designer performs, as needed, the parameter input for the plurality of desired given ladders Lg translated to the conversion operation folder, by using the setting sheet 50 of FIG. 5. In this connection, the setting (i.e., the addition) of the parameter according to the parameter input may be executed by using, for example, a ladder preparing tool previously provided in the controller 22, such as a PLC, instead of being executed by the program generating section 20. In this case, the system designer transfers the given ladders Lg requiring the setting of the parameter from the conversion folder to the ladder creating tool in the controller 22, and transfers the given ladders Lg with the parameter set therefor back to the conversion task folder, after the parameter setting has been completed using the ladder creating tool.

Figure 14:
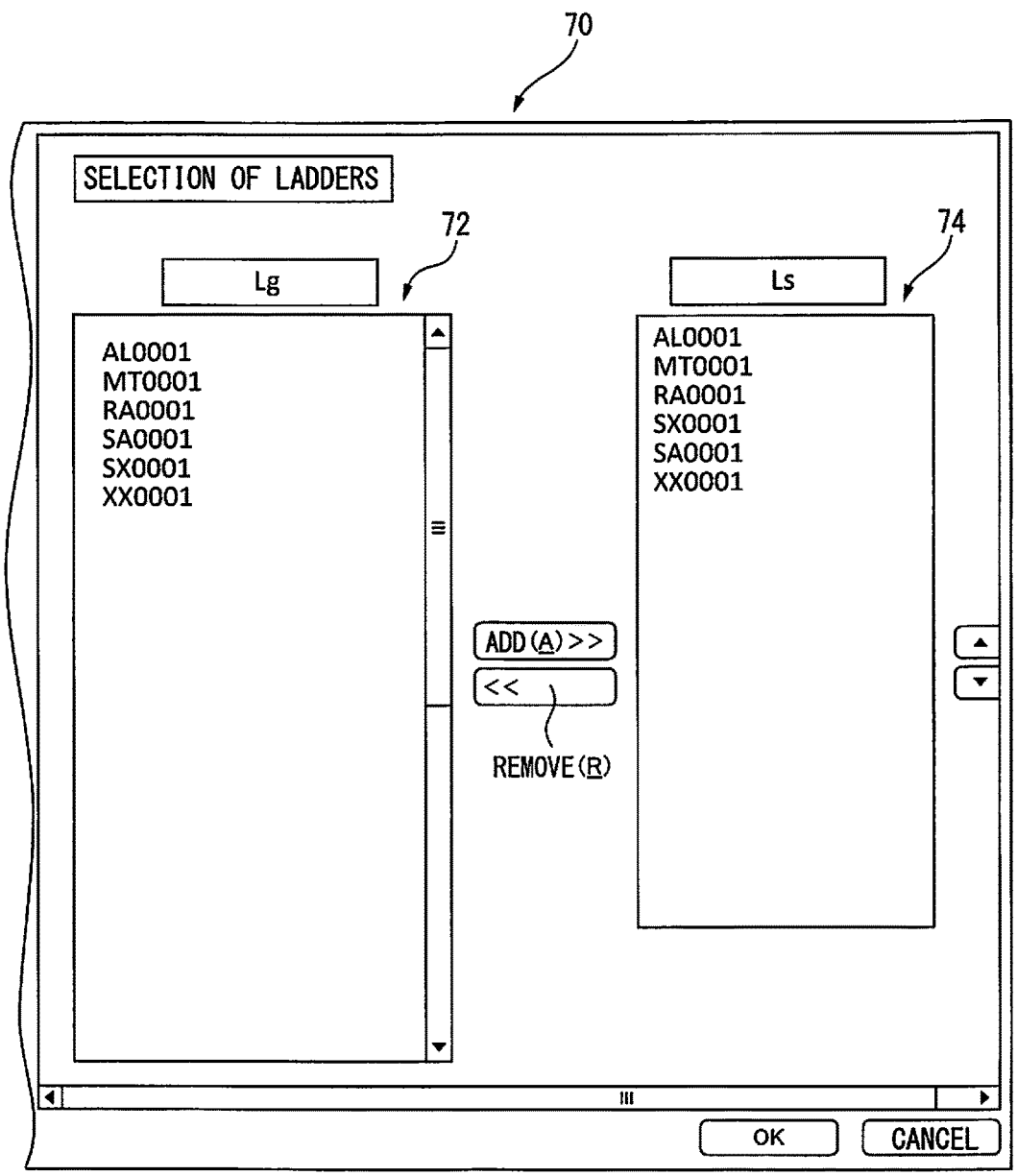
FIG. 14 is an illustration showing a ladder edit screen used in the ladder conversion algorithm of FIG. 13.

Next, the sequence-control programming apparatus 10, 30, 60 displays a ladder edit screen 70 shown in FIG. 14, on, for example, the display connected to the personal computer (Q3). In the ladder edit screen 70, an Lg field 72 in which the item numbers of the plurality of desired given ladders Lg placed in the conversion operation folder are randomly listed, and an Ls field 74 in which the item numbers of the given ladders Lg included in the converted system-compatible ladder Ls are listed in the execution order, are displayed. The system designer selects one desired given ladder Lg from the desired given ladders Lg listed in the Lg field 72 and clicks an "add key" (i.e., registers the given ladder Lg), and repeats these actions for all of the listed given ladders Lg in the execution order determined by the system designing (Q4). In this way, the plurality of desired given ladders Lg are listed in the Ls field 74 in a manner as to be arranged from the top to the bottom of the screen in the order of clicking the "add key" (i.e., in the execution order).

The action of clicking the "add key" in the execution order for the plurality of desired given ladders Lg listed in the Lg field 72 corresponds to an order designation input performed by the system designer to designate the execution order of the plurality of desired given ladders Lg selected by the selection input. The selection input section 18 of the sequence-control programming apparatus 10, 30, 60 receives the order designation input, and sends the program generating section 20 a matter indicating which execution order is designated for the plurality of desired given ladders Lg selected by the selection input. The program generating section 20 is configured to arrange the plurality of desired given ladders Lg extracted from the storage section 16 in the execution order, in accordance with the order designation input received by the selection input section 18, so as to convert the desired given ladders Lg into the single system-compatible ladder Ls (Q5). The plurality of desired given ladders Lg arranged in the execution order, listed in the Ls field 74 of the ladder edit screen 70, correspond to the converted single system-compatible ladder Ls.

While the invention has been described with reference to specific embodiments, it will be understood, by those skilled in the art, that various changes or modifications may be made thereto without departing from the scope of the following claims.

The invention claimed is:

1. A sequence-control programming apparatus that generates a control program for sequence control of an operating system including a robot and an operating instrument that cooperates with the robot, the sequence-control programming apparatus comprising:

a storage device that stores plural types of given ladders respectively describing plural types of commands separately from each other by ladder logic, the commands related to a specific operation to be executed by the operating system, and several given ladders describing commands of mutually different contents and being provided in connection with each of the plural types of given ladders; and a processor that prepares a selection sheet including select fields corresponding to the several given ladders provided in connection with each of the plural types of given ladders, receives a selection input in the select fields of the selection sheet for selecting one or more of the several given ladders provided in connection with each of the plural types of given ladders so as to select a plurality of desired given ladders from the plural types of given ladders, extracts the plurality of desired given ladders from the storage device in accordance with the selection input, and combines the extracted desired given ladders to convert the extracted desired given ladders into a single system-compatible ladder for making the operating system execute the specific operation, so as to generate the control program, wherein a controller controls at least one of the robot and the operating instrument in accordance with the control program generated by the sequence-control programming apparatus.

2. The sequence-control programming apparatus of claim 1, wherein the storage device stores, in addition to the previously stored plural types of given ladders, a new given ladder describing, by ladder logic, a new command related to the specific operation and different from the plural types of commands, and the processor receives the selection input for selecting the plurality of desired given ladders from among the new given ladder and the plural types of given ladders.

3. The sequence-control programming apparatus of claim 1, wherein
the processor further
receives a parameter input for setting a parameter, as needed, for each of the plural types of given ladders stored in the storage device,
adds, in accordance with the parameter input, the parameter to the plurality of desired given ladders extracted from the storage device, and
converts the desired given ladders with the parameter added thereto into the single system-compatible ladder.

4. The sequence-control programming apparatus of claim 1, wherein
the processor further receives a correction input for correcting a command, as needed, for a given ladder stored in the storage device.

5. The sequence-control programming apparatus of claim 1, wherein
the processor further
receives an order designation input for designating an execution order of the plurality of desired given ladders selected by the selection input, and
arranges the plurality of desired given ladders extracted from the storage device in the execution order, in accordance with the order designation input, to convert the desired given ladders into the single system-compatible ladder.

6. An operating system, comprising:
a sequence-control programming apparatus comprising:
a storage device that stores plural types of given ladders respectively describing plural types of commands separately from each other by ladder logic, the commands related to a specific operation to be executed by the operating system, and several given ladders describing commands of mutually different contents and being provided in connection with each of the plural types of given ladders; and
a processor that
prepares a selection sheet including select fields corresponding to the several given ladders provided in connection with each of the plural types of given ladders,
receives a selection input in the select fields of the selection sheet for selecting one or more of the several given ladders provided in connection with each of the plural types of given ladders so as to select a plurality of desired given ladders from the plural types of given ladders,
extracts the plurality of desired given ladders from the storage device in accordance with the selection input, and
combines the extracted desired given ladders to convert the extracted desired given ladders into a single system-compatible ladder for making the operating system execute the specific operation, so as to generate the control program;
a robot;
an operating instrument that cooperates with the robot; and
a controller that controls at least one of the robot and the operating instrument in accordance with the control program generated by the sequence-control programming apparatus.

7. A sequence-control programming method of generating a control program for sequence control of an operating system including a robot and an operating instrument that cooperates with the robot, the sequence-control programming method comprising:
preparing plural types of given ladders respectively describing plural types of commands separately from each other by ladder logic, the commands related to a specific operation to be executed by the operating system, and several given ladders describing commands of mutually different contents and being provided in connection with each of the plural types of given ladders;
preparing a selection sheet including select fields corresponding to the several given ladders provided in connection with each of the plural types of given ladders;
extracting a plurality of desired given ladders from the plural types of given ladders in accordance with a selection input in the select fields of the selection sheet, the selection input selecting one or more of the several given ladders provided in connection with each of the plural types of given ladders; and
combining the extracted desired given ladders to convert the extracted desired given ladders into a single system-compatible ladder for making the operating system execute the specific operation, so as to generate the control program, wherein a controller controls at least one of the robot and the operating instrument in accordance with the control program generated by the sequence-control programming method.

8. The sequence-control programming method of claim 7, further comprising:
adding a parameter, as needed, to the extracted desired given ladders; and
converting the desired given ladders with the parameter added thereto into the single system-compatible ladder.

* * * * *